United States Patent
Medvinsky et al.

(10) Patent No.: US 6,839,841 B1
(45) Date of Patent: Jan. 4, 2005

(54) SELF-GENERATION OF CERTIFICATES USING SECURE MICROPROCESSOR IN A DEVICE FOR TRANSFERRING DIGITAL INFORMATION

(75) Inventors: Alexander Medvinsky, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/890,178

(22) PCT Filed: Jan. 28, 2000

(86) PCT No.: PCT/US00/02317

§ 371 (c)(1),
(2), (4) Date: Jan. 3, 2002

(87) PCT Pub. No.: WO00/45241

PCT Pub. Date: Aug. 3, 2000

Related U.S. Application Data

(60) Provisional application No. 60/128,772, filed on Apr. 9, 1999, and provisional application No. 60/117,788, filed on Jan. 29, 1999.

(51) Int. Cl.$^7$ ............................................... H04L 8/00
(52) U.S. Cl. ...................................... 713/175; 713/168
(58) Field of Search .................................. 713/150, 168, 713/175, 156–158

(56) References Cited

U.S. PATENT DOCUMENTS

| | | | | | |
|---|---|---|---|---|---|
| 4,868,877 A | * | 9/1989 | Fischer | ........................ | 713/157 |
| 4,935,962 A | * | 6/1990 | Austin | ........................ | 713/159 |
| 5,297,206 A | * | 3/1994 | Orton | ........................... | 380/30 |
| 5,664,017 A | * | 9/1997 | Gressel et al. | ................. | 380/30 |
| 5,781,629 A | * | 7/1998 | Haber et al. | ................. | 713/177 |
| 5,917,912 A | * | 6/1999 | Ginter et al. | ................ | 713/187 |
| 6,035,402 A | * | 3/2000 | Vaeth et al. | ................. | 713/201 |

* cited by examiner

Primary Examiner—Ilwoo Park
(74) Attorney, Agent, or Firm—Townsend and Townsend and Crew LLP

(57) ABSTRACT

Devices in a telecommunications system are provided with means to self-generate public key pairs and certificates. This eliminates the need for such keys and certificates to be sent to the devices from an outside source so a single-trust approach can be maintained. A manufacturer's certificate is installed into a device it the time of manufacture. The device only issues itself certificates based on a signed request from an external outside server. The device's self-issued certificates incorporate information obtained from the server in a profile. This allows control by the server over a device's self-issued certificates. In order to prevent tampering, and breaking, of the self-issued certificates, the certificate issuing process occurs within a secure microprocessor.

3 Claims, 3 Drawing Sheets

SELF-GENERATION OF CERTIFICATES USING SECURE MICROPROCESSOR IN A DEVICE FOR TRANSFERRING DIGITAL INFORMATION

This application claims the benefit of Provisional application Ser. Nos. 60/117,788, filed Jan. 29, 1999, and 60/128,772, filed Apr. 9, 1999.

BACKGROUND OF THE INVENTION

This invention relates in general to secure data transfers in digital systems and more specifically to a device in such a digital system that has the ability to self-issue certificates in a secure manner.

Public key systems have become a very popular means for providing security in digital systems. Public Key Systems (PKS) have two different keys, one for encryption, or signing, and one for decryption, or verifying. This separation of keys has great security value in that the sign/decrypt function can be securely isolated from verify/encrypt functions, as is appropriate for the typical use of these keys. Public key systems are also known as asymmetric systems, or cryptosystems, as opposed to non-public key systems that are known as symmetric, or secret key, systems.

To send a message in a public key system, a sender obtains the receiver's public key. The sender uses the public key to encrypt a message. The encrypted message is then sent to the receiver. Since only the receiver has the corresponding private key of the public/private key pair, only the intended receiver can decrypt and view the encrypted message.

However, a problem arises in that the sender may not be sure that they have obtained the receiver's correct public key in the first place. For example, a fraudulent public key may have been provided under the guise of the receiver's public key. In order to prevent this, "certificates" are used to generate confidence in the legitimacy of a public key. A certificate is typically the information that is included along with a signed message, where the certificate includes the public key required to verify the signature on the message. The certificate is signed with the certifying authority's private key and can be verified by a recipient of the certificate by using the certifying authority's public key. Of course, the same problem of obtaining the known certifying authority's correct public key in the first place still exists. A sequence of certified public keys can be obtained from sources of progressively higher trust, where each preceding certificate's public key comes from a successively more trustworthy source. At some point, the user of a certificate's public key must be able to trust, or be assured that, the original public key for the chain of certificates does, indeed, come from the proper source and is valid.

The act of user authentication (verification of user identity) usually includes the verification of the user's certificate. Usually the certificate includes the identity of the sender, the identity of the certificate issuer, the sender's public key, the time period for which the certificate is valid, etc.

Sometimes it is necessary to update key pairs by sending new key pairs from one device to another. This procedure can benefit from being validated by certificates, but where the updating occurs frequently the inclusion of certificate processing can put a high processing burden on the participating systems. Also, certificates need to be generated, signed and transferred in order to minimize the effect that a "broken" or "stolen" private key could have on a system.

The maintenance of security based on a public key scheme, certificates, authentication, etc., is referred to as a system's Public Key Infrastructure (PKI). An example of telecommunications systems where the implementation of a traditional PKI is problematic or prohibitive is in a large scale digital network, such as the Internet. Where the data being transferred is high bandwidth using many transactions of small size, the number of discrete exchanges of data, along with their corresponding encryption, decryption, authentication, etc., is extremely large. However, the need for security such as is provided by a PKI is also great, especially in applications such as telephony, or other secure data transfers such as banking, etc.

Telecommunications systems that are large and based around flexible protocols such as Internet Protocol (IP) typically use many servers, switches, routers and other devices for transferring data. Each device is usually a discrete box that can use a combination of hardware and software. Many such devices are located in diverse locations many miles apart. It is necessary not only to ensure that communication between the devices remains secure, but also that processing within each device is highly immune from security attacks.

Shorter keys are often useful because their security functions (i.e., encoding/encrypting or decoding/decrypting) require less time than longer keys. However, the level of security provided is less than with longer keys so the shorter keys and certificates need to be replaced more often. If the initial keys and certificates are installed by the unit (e.g. cable telephony adapter) manufacturer while the replacement keys and certificates are transferred from the network service provider, a "dual trust" hierarchy is created that is not as robust as a single trust approach.

Thus, it is desirable to provide a security system for use in telecommunications systems that handles certification efficiently.

SUMMARY OF THE INVENTION

The present invention allows consumer communications device such as an IP telephony adapter to self-generate public key pairs and certificates. This eliminates the need for such keys and certificates to be sent to the devices from an outside source so a single-trust approach can be maintained. In another embodiment, public key pairs may be generated by a server and delivered to the consumer device in an encrypted and signed message. The certificate for the delivered public key would still be generated inside the consumer device. A manufacturer-signed consumer device certificate for a large public key is installed into a device at the time of manufacture. The device only issues itself certificates (for a newly generated shorter key pair) based on a signed request from an external outside server. The device's self-issued certificates incorporate information obtained from the server in a profile. This allows control by the server over a device's self-issued certificates. In order to prevent tampering, and breaking, of the self-issued certificates, the certificate issuing process occurs within a secure microprocessor.

The invention discloses a method for providing self-issuing certificates in a device in a telecommunications system. The method includes receiving, from an external source, a request to generate a new certificate, wherein the request includes a certificate parameter, using a secure microprocessor to generate a new certificate that uses the certificate parameter; and using the new certificate in data transfers.

The preferred embodiment includes receiving, from an external source, a request to generate a new certificate, wherein the request includes a signed profile of what parameters should appear in the new certificate. The device generates a new public/private key pair and then signs a new certificate—all done as a single combined operation inside a secure microprocessor. In another embodiment, the request itself includes a public key and an encrypted private key. The device in that case decrypts the private key and signs the new certificate—again, all done inside a secure microprocessor as a single combined operation The decryption key used is a (longer) private key that was installed in the device at the time of manufacture.

In both embodiments, the device can sign the new certificate with a (longer) certificate signing key that was installed at the time of manufacture. The new key pair and certificate, along with the pre-installed certificate for the device's certificate-signing key, can be used to secure call signaling and other communications.

DESCRIPTION OF THE SPECIFIC EMBODIMENTS

Figure 2A:
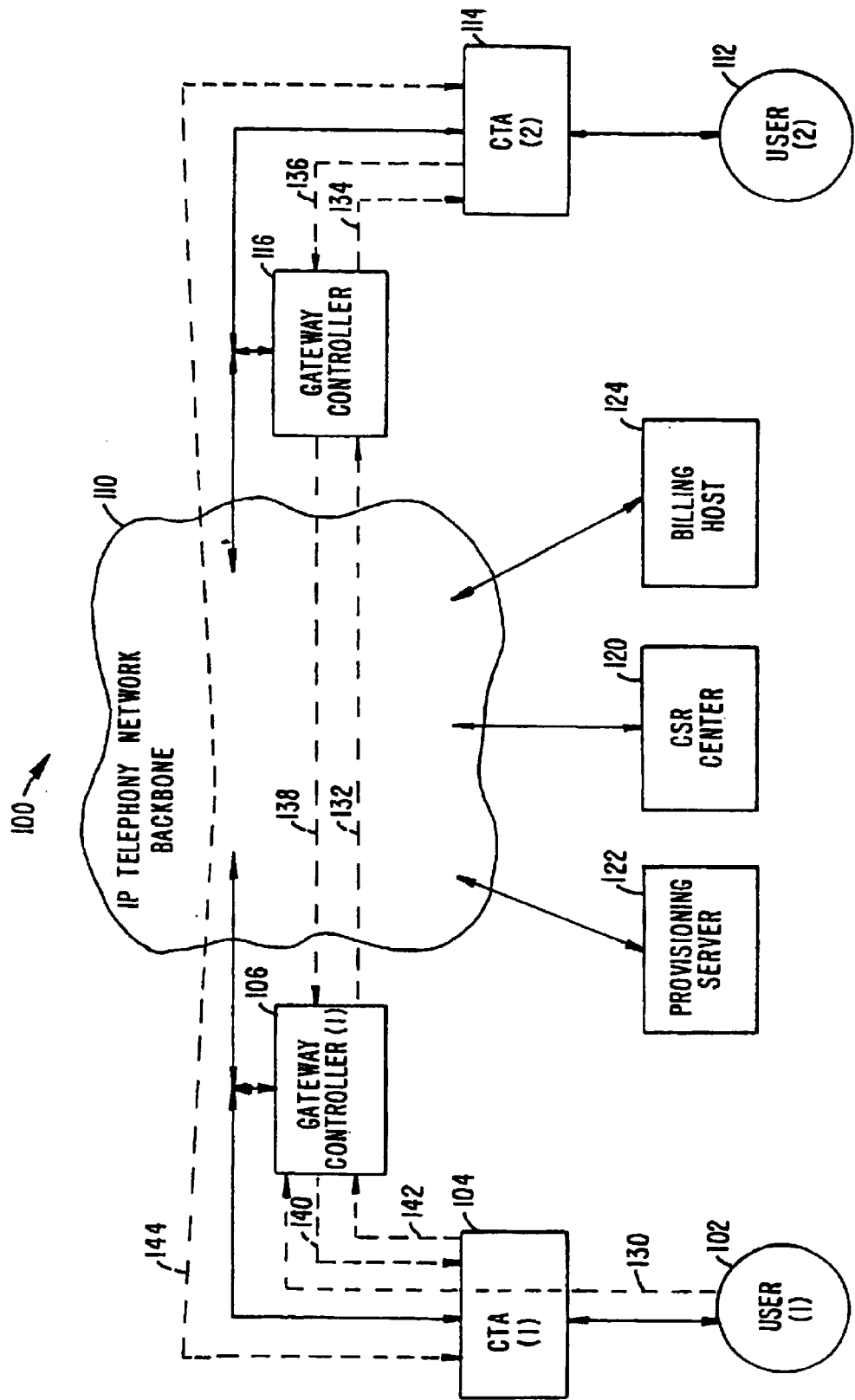
FIG. 2A shows a portion of a telephony network 100 including a Cable Telephony Adapter.

The present invention is preferably included in a cable telephony system that is described in detail in the priority documents referenced at the beginning of this specification. Although specific reference is made to a cable telephony system, the invention is adaptable for use in virtually any telecommunications system that uses secured transactions.
Cable Telephony Adapter FIG. 2A shows a portion of an IP telephony network 100 constructed in accordance with the present invention. The network 100 includes a first user 102 coupled to a source CTA 104. The source CTA 104 is further coupled to a source gateway controller 106 and an IP telephony network backbone 110.

The network 100 also includes a second user 112 coupled to a destination CTA 114. The destination CTA 114 is further coupled to a destination gateway controller 116 and the IP telephony network backbone 110. In addition, the network 100 also includes a customer service representative (CSR) center 120, a provisioning server 122 and a billing host 124.

Each user of the network 100 goes through an initialization process to activate network service. For example, when the user 102 and associated CTA 104 are coupled to the network, a series of messages are exchanged between the CTA 104, the gateway controller 106 and the CSR 120. The messages provide for activation of telephony service for the user 102, establishment of account information and creation of encryption keys to be used by the CTA to encrypt and decrypt messages exchanged over the networks The billing host 124 is used to setup account information for each user and to bill for network usage. The provisioning server 122 is used to initialize and register CTA devices within a specific IP telephony network.

Figure 2B:
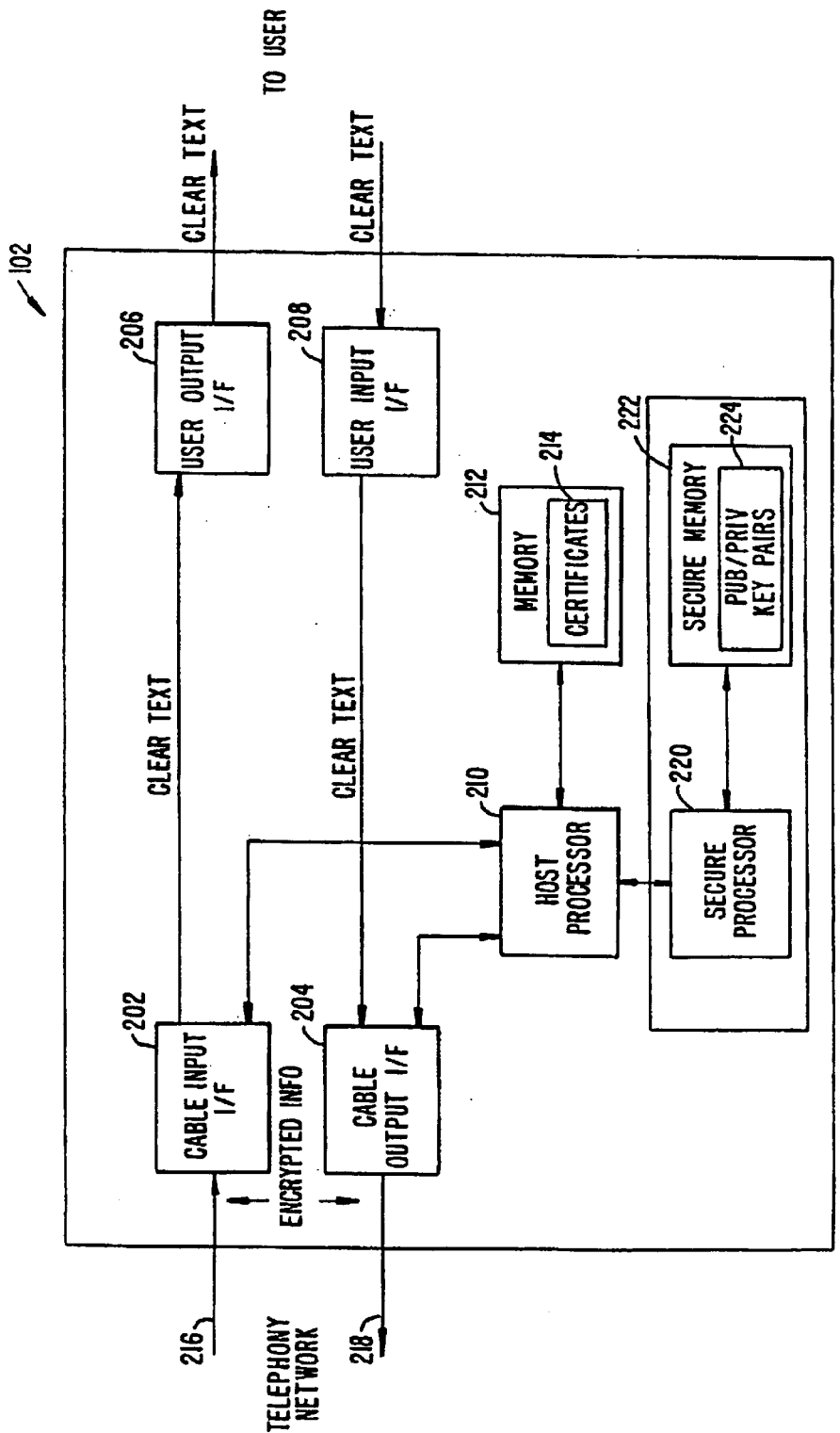
FIG. 2B shows an exemplary embodiment of the CTA.

FIG. 2B shows an exemplary embodiment of the CTA 104 constructed in accordance with the present invention. The CTA 104 includes a cable input interface (I/F) 202, a cable output I/F 204, a user output I/F 206, a user input I/F 208, a host processor 210, a memory 212 and an additional secure processor 220 along with secure memory 222, used to protect public/private key pairs 224. Certificates 214 are stored in regular memory because they are signed and don't require additional protection.

The cable input I/F 202 is coupled to a cable telephony input 216. The cable output I/F 204 is coupled to a cable telephony output 218. The cable telephony input and output I/F couple the CTA 200 to a cable telephony network, such as by connecting to a cable modem (not shown) that is coupled to the cable telephony network. In another embodiment, the cable modem is included in the CTA so that the cable telephony network may be connected directly to the CTA.

The processor 210 couples to the cable input I/F 202 and the cable output I/F 204 to provide processing of information received and transmitted, respectively, on the telephony network. The line 216 carries secure encrypted and/or signed information which cannot be processed directly by the host processor, since it does not have access to cryptographic keys. The host processor has to pass on this information to the secure processor, which has access to the necessary keys to perform cryptographic operations. The connections between the cable I/F modules and the user I/f modules carry unencrypted information. The unencrypted information is commonly referred to as clear text, which extends back to the user. Similarly, when clear text user input needs to be encrypted and/or signed, this cannot be done directly by the host processor. It passes on the information to the secure processor that performs the cryptographic operations. This way, encrypted and/or signed data appears on line 218.

The certificates in 214 cryptographically bind each public key to an identity. The short, self-signed public key may be bound to either the device or user identity, while the longer public keys installed at the time of manufacture must be bound to the identity of the device (since the user identity is unknown at that time). The certificates are not protected in secure memory because they are already cryptographically protected with a digital signature.
Self-Issuance of Certificates FIG. 1 is a flowchart that describes the basic steps of the present invention.

Figure 1:
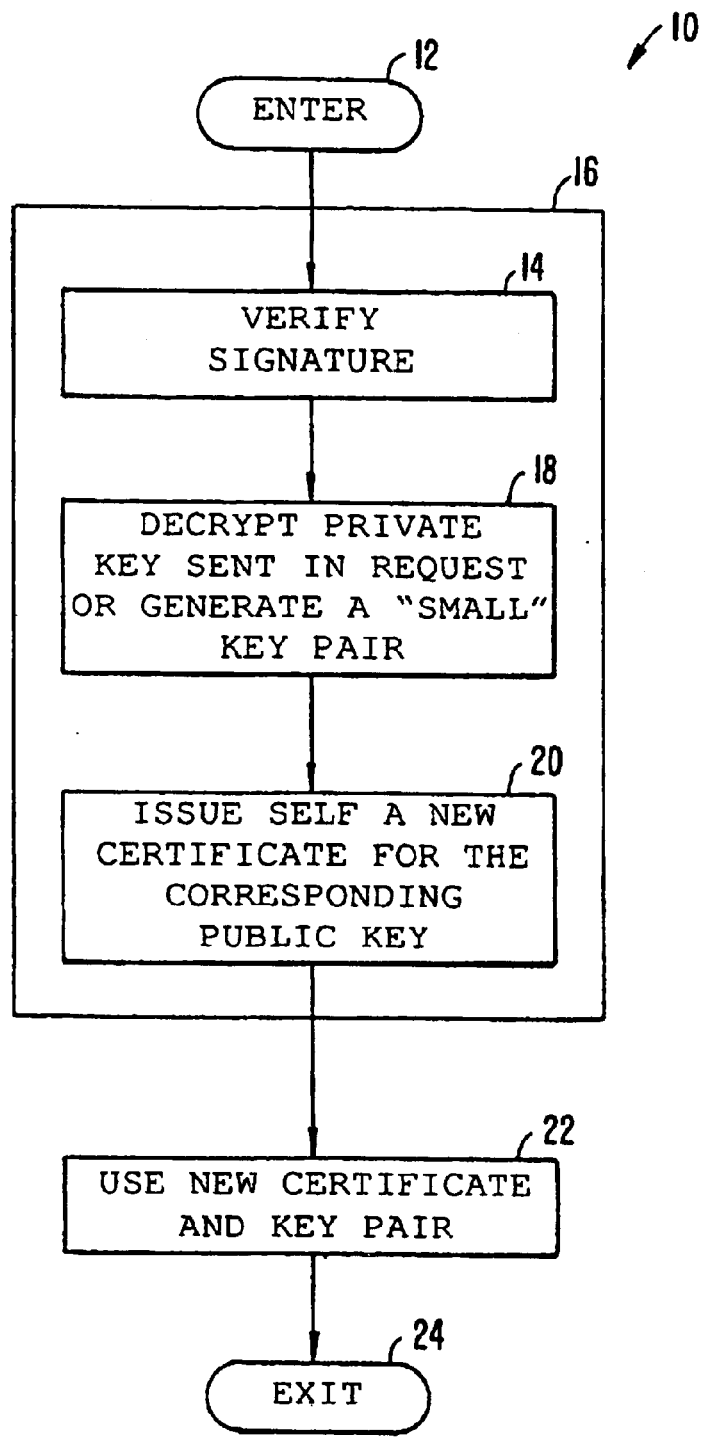
FIG. 1 is a flowchart that describes the basic steps of the present invention.

In FIG. 1, flowchart 10 is entered during provisioning when the CTA gets a request from a server to issue itself a certificate for a new public key. For example, the preferred embodiment uses a 768-bit RSA key pair as a 'small' key pair with a self-issued certificate. The CTA is provided with a large 2048-bit RSA public/private certificate signing key pair and a corresponding public key certificate upon manufacture of the CTA at a factory. A large key-exchange public/private key pair (e.g., 2048-bit RSA key pair) and a corresponding certificate are also installed into the CTA at the factory.

Steps 14, 18 and 20 are performed by the secure microprocessor in the CTA. Thus, all of the steps necessary to issue a certificate for a small public key and certificate are performed inside the secure microprocessor. At step 14, the request from the server is authenticated by verifying the signature. In the preferred embodiment, in step 18 a "short" (e.g. 768-bit) RSA key pair is generated inside the secure microprocessor. In another embodiment, step 18 results in the decryption of the "short" RSA private key sent in the certificate request. At step 20, the CTA issues itself a new certificate for the corresponding public key that is also included in the server request. This new certificate is signed with the CTA's large certificate-signing key. The parameters in the new certificate (e.g., validity time) are copied from the certificate request sent by the server and are used in the self-issued certificate. Table I shows a list of different parameters in the profile of the server request. Table II lists the parameters that are copied over to the certificate from the profile in the request.

TABLE I 768-bit RSA Private Key (optional - used if the device does not generate a key pair, itself)
768-bit Public Key (optional - used if the device does not generate a key pair, itself)
Key/Certificate Validity Period (start and stop times)
Network ID
CTA ID
Signature Algorithm (e.g., RSA over SHA-1)
Signature Over Certificate Request
Network Certificate (2048-bit)
Network Equipment Manufacturer Certificate

TABLE II

Public Key (optional - used if the device does not generate a key pair, itself)
Key/Certificate Validity Period (start and stop times)
Network (or Service Provider) ID
CTA (or user) ID After creation of the new certificate, and corresponding key pair, the CTA can use them to either authenticate itself or for secure key exchanges. Because the new certificate is issued inside a secure microprocessor, a hacker can't tamper with the certificate-issuing process. The certificate is based on the information in the server certificate request. Also, it is difficult for a hacker to imitate a server certificate request as the request must be signed with the server's private key.

Note that variations from the specific embodiments discussed here are possible. For example, different key sizes and public key technology (e.g., RSA, Elliptic Curve, El Gamal, etc.) may be used. Thus, although the invention has been presented with respect to specific embodiments thereof, these embodiments are merely illustrative, and not restrictive, of the invention, the scope of which is to be determined solely by the appended claims.

What is claimed is:

1. A method for providing self-issuing certificates in a first device in a telecommunications system, the first device having a certificate-signing key, the method comprising:

receiving, from an external source, a request to generate a new certificate, wherein the request includes a public key, wherein the public key is smaller in size than the certificate-signing key;

using a secure microprocessor inside the first device to generate a new certificate for the public key; and directing the first device to use the new certificate in data transfers.

2. The method of claim 1, wherein the request includes a validity time, the method further comprising:

including the validity time in the new certificate.

3. The method of claim 1, wherein the new certificate is provided to a second device, allowing the second device to use a smaller public/private key pair.

* * * * *